US008824593B2

(12) United States Patent
 Tarighat Mehrabani

(10) Patent No.: US 8,824,593 B2
(45) Date of Patent: Sep. 2, 2014

(54) WIRELESS COMMUNICATION DEVICE CAPABLE OF PRE-COMPENSATING FOR OSCILLATOR PHASE NOISE

(75) Inventor: Alireza Tarighat Mehrabani, Laguna Beach, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/434,505

(22) Filed: Mar. 29, 2012

(65) Prior Publication Data
US 2013/0259106 A1 Oct. 3, 2013

(51) Int. Cl.
 *H04K 1/02* (2006.01)
(52) U.S. Cl.
 USPC .................. 375/296; 398/193; 455/114.3
(58) Field of Classification Search
 None
 See application file for complete search history.

(56) References Cited

U.S. PATENT DOCUMENTS

| | | | | |
|---|---|---|---|---|
| 6,157,264 A * | 12/2000 | Adkins | | 331/25 |
| 6,829,311 B1 * | 12/2004 | Riley | | 375/326 |
| 7,010,280 B1 * | 3/2006 | Wilson | | 455/126 |
| 2007/0038095 A1 * | 2/2007 | Greenleaf et al. | | 600/438 |

* cited by examiner

*Primary Examiner* — Adolf Dsouza
(74) *Attorney, Agent, or Firm* — Sterne, Kessler, Goldstein & Fox, PLLC

(57) ABSTRACT

A wireless transmitter is disclosed that is capable of pre-compensating for oscillator phase noise. In the transmitter, an undesired phase noise being generated by a voltage-controlled oscillator can be detected by comparing the output of the voltage-controlled oscillator to a reference oscillator output. The phase can then be detected by calculating a desired number of zero crossings over a given time period, and comparing this value to an actual number of zero crossings detected in the signal generated by the voltage-controlled oscillator over the same period. From this, the phase component can be determined and digitally pre-compensated in a data signal.

19 Claims, 10 Drawing Sheets

WIRELESS COMMUNICATION DEVICE CAPABLE OF PRE-COMPENSATING FOR OSCILLATOR PHASE NOISE

BACKGROUND

1. Field of Invention

The disclosure relates to wireless communications, and more specifically to a wireless communication device that is capable performing phase noise compensation prior to signal transmission.

2. Related Art

Wireless communication devices, such as cellular telephones to provide an example, are becoming commonplace in both personal and commercial settings. The wireless communication devices provide users with access to all kinds of information, as well as the ability to communicate with other such devices across large distances. For example, a user can access the internet through an internet browser on the device, download miniature applications (e.g., "apps") from a digital marketplace, send and receive emails, or make telephone calls using a voice over internet protocol (VoIP). Consequently, wireless communication devices provide users with significant mobility, while allowing them to remain "connected" to communication channels and information.

Wireless communication devices communicate with one or more other wireless communication devices or wireless access points to send and receive data. Typically, a first wireless communication device generates and transmits a radio frequency signal modulated with encoded information. This radio frequency signal is transmitted into a wireless environment and is received by a second wireless communication device. The second wireless communication device demodulates and decodes the received signal to obtain the information. The second wireless communication device may then respond in a similar manner. The wireless communication devices can communicate with each other or with access points using any well-known modulation scheme, including: amplitude modulation (AM), frequency modulation (FM), quadrature amplitude modulation (QAM), phase shift keying (PSK), quadrature phase shift keying (QPSK), and/or orthogonal frequency-division multiplexing (OFDM), as well as any other communication scheme that is now, or will be, known.

During communication, local oscillators within a wireless transmitter and a wireless receiver generate high-frequency sinusoids in order to modulate and demodulate the communicated signals. However, due to imperfections in the local oscillators, an undesired phase component is often introduced to the sinusoids in the form of phase noise that changes over time. Conventional phase noise compensation is performed in the wireless receiver based on communicated pilot symbols. However, the phase noise injected by the transmitter will compound with the phase noise injected by the receiver. This may result in the phase noise fluctuating too quickly for proper compensation by the receiver.

BRIEF DESCRIPTION OF THE DRAWINGS/FIGURES

Embodiments are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION OF THE INVENTION

Figure 1:
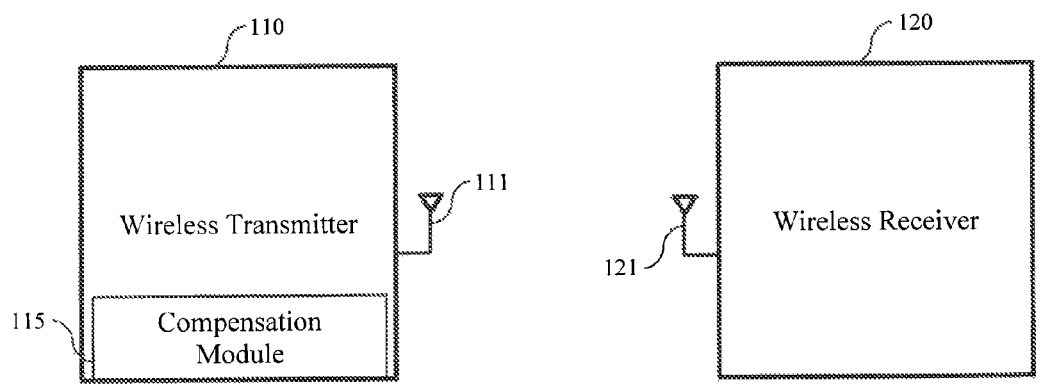
FIG. 1 illustrates a block diagram of an exemplary wireless communication environment.

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not mead to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer, as described below.

For purposes of this discussion, the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the following description is to be described in terms of wireless communication (specifically cellular communication), those skilled in the relevant art(s) will recognize that this description may also be applicable to other communications that use wired, optical, or other wireless communication methods without departing from the spirit and scope of the present disclosure.

An Exemplary Wireless Communications Environment

FIG. 1 illustrates an exemplary block diagram of a wireless communication environment 100. The wireless communication environment 100 provides wireless communication of information, such as one or more commands and/or data between wireless communication devices. The wireless communication devices may each be implemented as a standalone or a discrete device, such as a mobile telephone, or may be incorporated within or coupled to another electrical device or host device, such as a portable computing device, a camera, or a Global Positioning System (GPS) unit or another computing device such as a personal digital assistant, a video gaming device, a laptop, a desktop computer, or a tablet, a computer peripheral such as a printer or a portable audio and/or video player to provide some examples and/or any other suitable electronic device that will be apparent to those skilled in the relevant art(s) without departing from the spirit and scope of the present disclosure.

The exemplary wireless communication environment 100 includes a wireless transmitter 110 and a wireless receiver 120. Each of the wireless transmitter 110 and the wireless receiver 120 may be included within corresponding wireless communication devices that are each capable of both wireless transmission and wireless reception. The wireless transmitter 110 may represent an exemplary embodiment of a base station, and the wireless receiver 120 may represent an exemplary embodiment of a user equipment/subscriber station within a cellular communications network.

Figure 2:
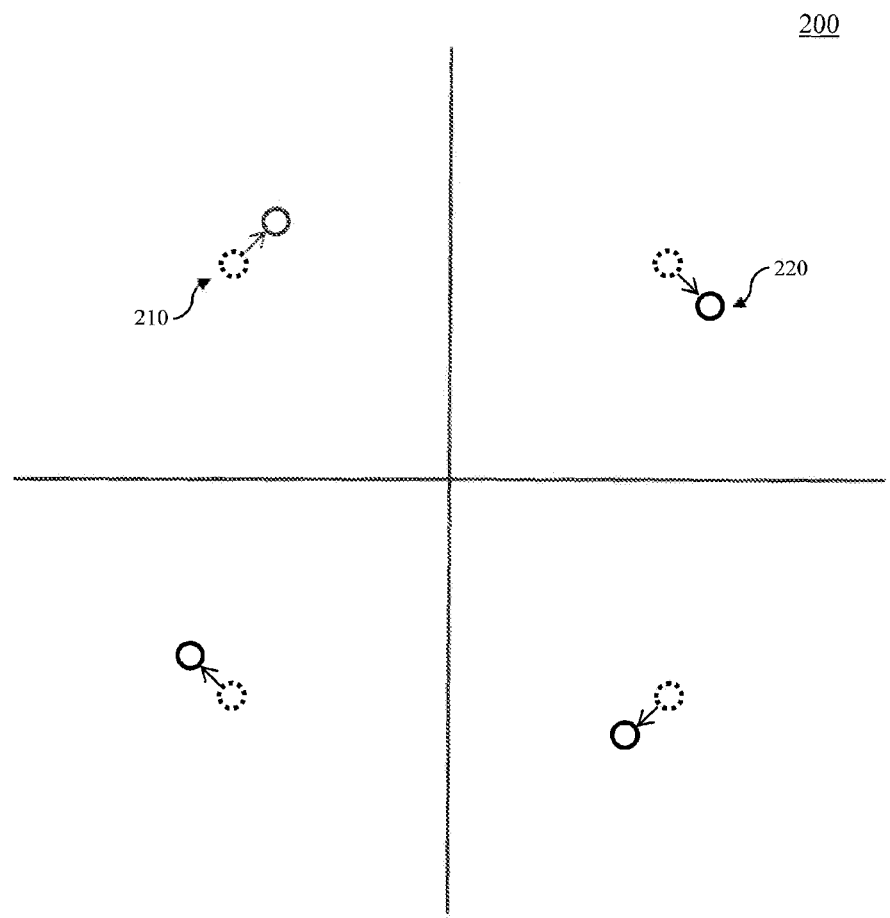
FIG. 2 illustrates an exemplary signal constellation.

FIG. 2 illustrates an exemplary signal constellation 200 that may be transmitted by the wireless transmitter 110 and received by the wireless receiver 120. The signal constellation 200 may represent an exemplary QAM, PSK, or other signal constellation within the spirit and scope of the present disclosure.

During communication, the wireless transmitter 110 may intend to transmit a signal constellation that includes the constellation points 210 (illustrated by dashed circles). However, due to a noisy oscillator in the wireless transmitter 110 and/or the wireless receiver 120, the intended signal points unintentionally become shifted constellation points 220 (illustrated by solid circles). Specifically, whether at transmission, reception, or both, the noisy oscillators will cause the constellation points to rotate or shift within the constellation. As a result, erroneous signals may be decoded by a wireless receiver. Although correction is conventionally performed within a wireless receiver, this correction may be insufficient to account for quick changes in phase noise, which may be more prevalent in systems having both a noisy receiver oscillator and a noisy transmitter oscillator.

Therefore, the wireless transmitter 110 includes a compensation module 115 that pre-compensates the outgoing signal for the noisy oscillation of the wireless transmitter 110. The wireless transmitter includes an antenna 111 for transmitting the signals into the wireless communication environment 100. Those skilled in the relevant art(s) will recognize that the antenna 111 may include an array of $N_t$ antennas, where $N_t$ is any positive integer, and that the antenna 111 may be capable of both transmitting and receiving signals.

The wireless receiver 120 may include conventional phase noise correction software, hardware and/or circuitry to assist in compensating for phase noise (especially phase noise generated by the wireless receiver 120), and includes an antenna 121 for receiving the signals from the wireless communication environment 100. Those skilled in the relevant art(s) will recognize that the antenna 121 may include an array of $N_r$ antennas, where $N_r$ is any positive integer, and that the antenna 121 may be capable of both transmitting and receiving signals.

Detailed functionality of the wireless transmitter and the compensation module 115 are discussed below, with respect to the relevant figures.

Exemplary Wireless Communication Device

Figure 3:
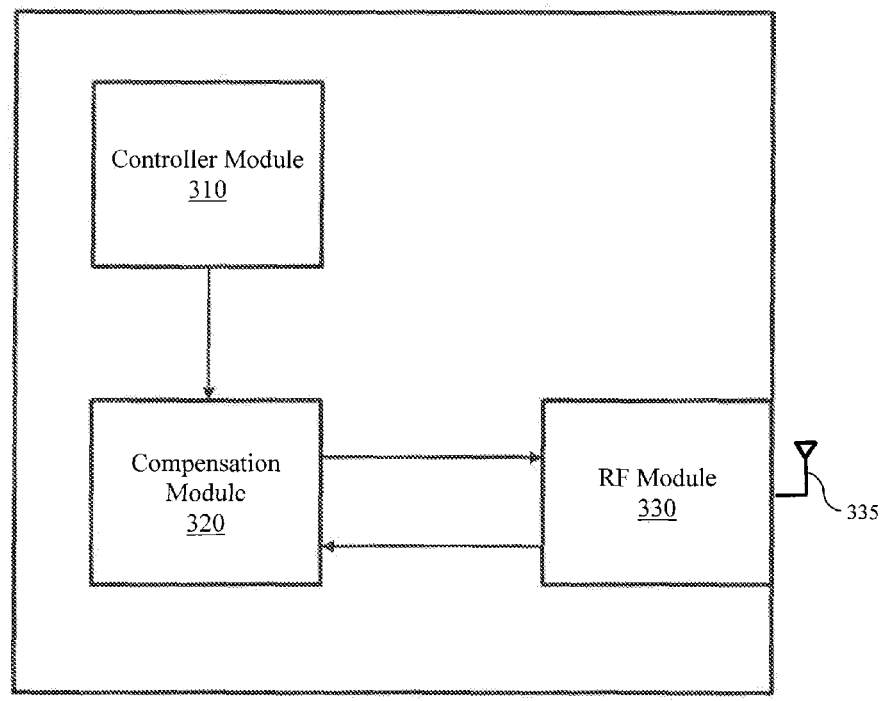
FIG. 3 illustrates a block diagram of an exemplary transmitter that may be implemented as part of the wireless communication environment.

FIG. 3 illustrates a block diagram of an exemplary transmitter 300 that may be implemented as part of the wireless communication environment 100. The transmitter 300 includes a controller module 310, a compensation module 320, an RF module 330 and an antenna 335, and may represent an exemplary embodiment of the wireless transmitter 110.

The controller module 310 performs various signal processing functions of received signals, and signals to be transmitted, as well as general control operations of the transmitter 300. After generating a data signal for transmission, the controller module 310 forwards the generated data signal to the compensation module 320. The compensation module 320 performs pre-compensation of the data signal based on feedback from the RF module 330, which indicates a state of an oscillator (not shown) of the transmitter 300. After pre-compensation, the signal is forwarded to the RF module 330 for transmission to the wireless communication environment 100 via the antenna 335.

An exemplary configuration of the transmitter 300 for compensating of outgoing signals, and more specifically the compensation module 320, is discussed in detail below.

Exemplary Configuration for Pre-Compensating Signals

Figure 4:
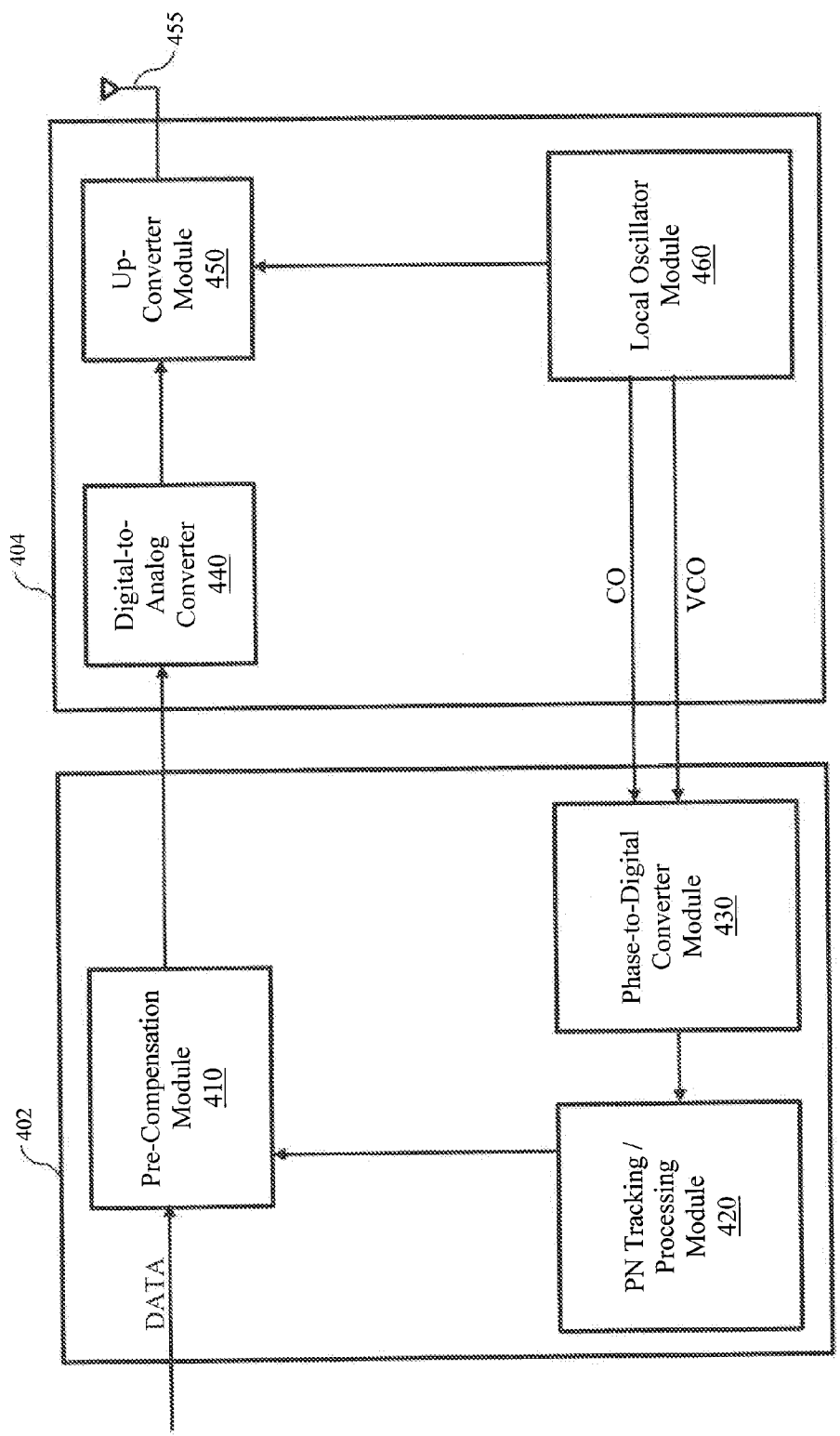
FIG. 4 illustrates an exemplary compensation module and RF module that may be implemented within the transmitter.

FIG. 4 illustrates an exemplary compensation module 402 and RF module 404 that may be implemented within the transmitter 300. The compensation module 402 includes a pre-compensation module 410, a phase noise tracking/processing module 420, and a phase-to-digital converter module 430, and may represent an exemplary embodiment of the compensation module 320. The RF module 404 includes a digital-to-analog converter (DAC) 440, and up-converter module 450, and a local oscillator module 460, and may represent an exemplary embodiment of the RF module 330.

As shown in FIG. 4, the RF module 404 receives a data signal from the compensation module 402. The DAC 440 converts the data signal from digital to analog and provides the signal to the up-converter module 450. The up-converter module 450 up-converts the analog data signal to a transmission frequency using a local oscillator signal that is generated by the local oscillator module 460.

The local oscillator module 460 may include, for example, a voltage-controller oscillator (VCO) in a phase-locked loop (PLL) with a crystal oscillator (CO) (see FIG. 8, discussed below). The CO can often be manufactured to be nearly noiseless. In other words, the CO may be capable of generating a nearly perfect sinusoid, e.g., $\sin(\Omega_{co}t)$, where $\Omega_{co}$ is the radian frequency (e.g. $2\pi f$) of the CO, and t is time. The CO operates at a relatively low frequency (e.g., 50 MHz). On the other hand, because the VCO employs semiconductor components to achieve an oscillator-like function, and because the VCO generally operates at a much higher frequency than the OC (e.g., 5 GHz), the VCO is often noisy despite being in the phase-locked loop with the CO. In other words, the VCO typically generates a sinusoid having an undesired phase component, e.g., $\sin(\Omega_{vco}t+\phi)$, where $\Omega_{vco}$ is the radian frequency of the VCO and $\phi$ is the undesired phase component.

Figure 5:
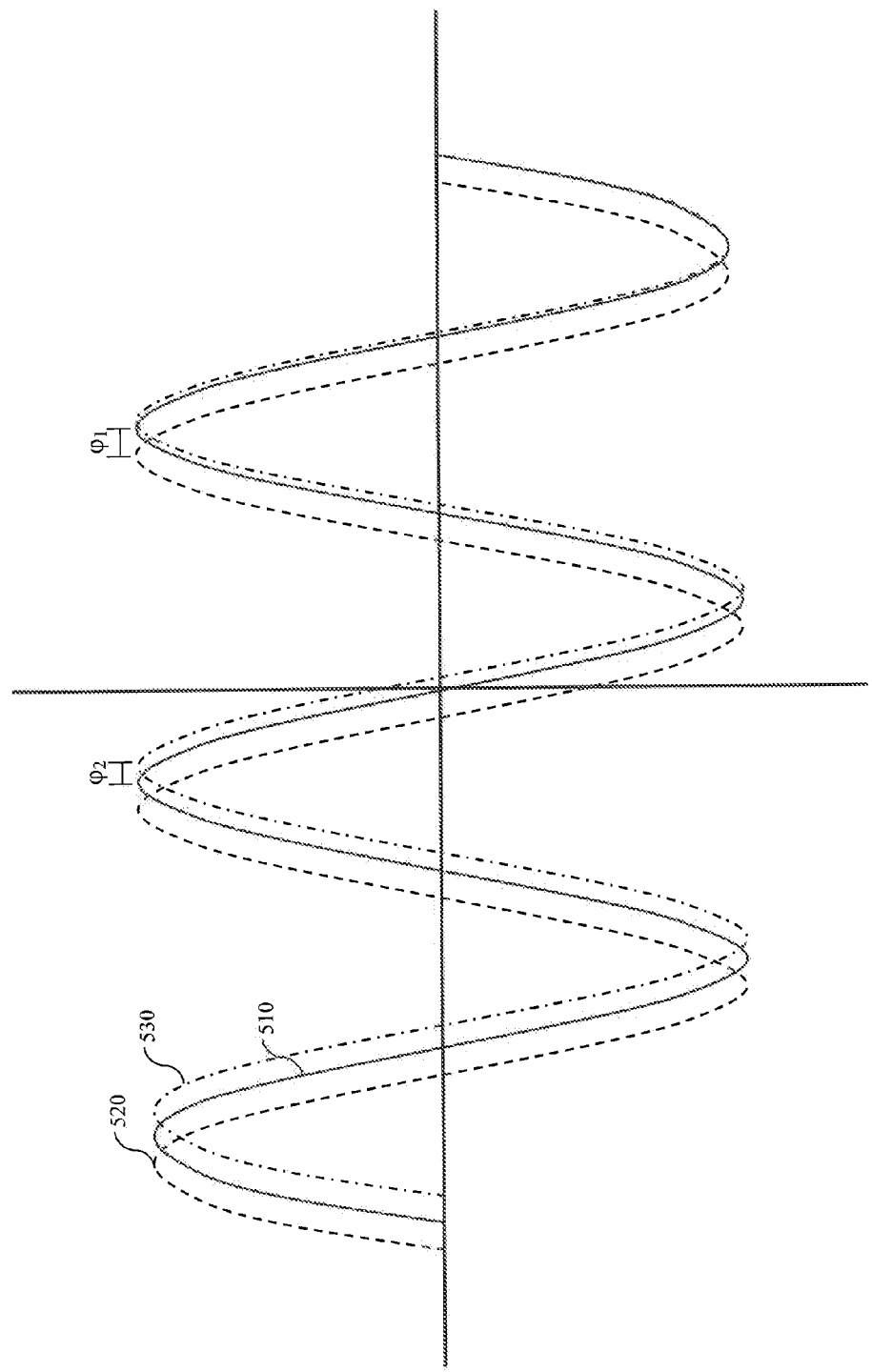
FIG. 5 illustrates exemplary local oscillator outputs.

FIG. 5 illustrates exemplary local oscillator outputs. The sinusoid 510 is an example of a perfect (noiseless) sinusoid. The perfect sinusoid 510 includes a constant frequency and zero phase shift. However, as discussed above, the local oscillator module 460 may output a noisy sinusoid, such as phase-shifted sinusoid 520 or frequency-shifted sinusoid 530.

For example, as shown in FIG. 5, the phase-shifted sinusoid 520 is shifted from the perfect sinusoid 510 by some phase component $\phi_1$ [e.g., $\sin(\Omega t+\phi_1)$]. As shown, the phase component $\phi_1$ remains constant, as the phase-shifted sinusoid 520 maintains the same frequency as the perfect sinusoid 510. However, a more common scenario involves a phase component that changes over time. For example, the frequency-shifted sinusoid 530 is shifted from the perfect sinusoid 510 by some phase component $\phi_2$. However, as can be seen in FIG. 5, the phase difference $\phi_2$ between the frequency-shifted sinusoid 530 and the perfect sinusoid 510 changes over time. Therefore, the frequency-shifted sinusoid 530 can be written as $\sin(\Omega t+\phi_2(t))$, which constitutes a shift in frequency. Further, as the phase $\phi_2$ changes, the frequency will also change, and may increase or decrease. In the frequency domain, as the phase $\phi_2$ changes, the local oscillator tone will appear to shift around over time, instead of being fixed, as desired. This may also be described as a frequency spread or "skirt" around the local oscillator tone when viewed on a spectrum analyzer.

In order to compensate for the undesired phase noise generated by the local oscillator module 460, the local oscillator module 460 sends the sinusoidal outputs of both its CO and VCO to the phase-to-digital converter module 430 within the compensation module 402. The phase-to-digital converter module 430 measures the phase component being generated by the local oscillator module 460. The phase-to-digital converter module 430 may be capable of representing the phase component digitally, and may be capable of performing these functions in the digital domain.

1. Phase Offset Detection

In an embodiment, the phase-to-digital converter module 430 determines the phase offset by detecting zero crossings of the VCO with respect to those of the CO. As discussed above, the CO will typically operate at a much lower frequency than the VCO (e.g., 50 MHz and 5 GHz, respectively). Further, the CO produces a sinusoid that is much closer to a perfect sinusoid than that produced by the VCO. Therefore, the phase offset of the VCO can be determined by comparing its output to the signal generated by the CO.

For example, the local oscillator module 460 may send both the output of the CO and the VCO to the phase-to-digital converter module 430. Because the CO signal is at a much lower frequency than the VCO output, the phase-to-digital converter module 430 can use the CO signal as a reference signal by which to measure the VCO signal, all of which can be performed based on detected zero-crossings of the signals.

Figure 6:
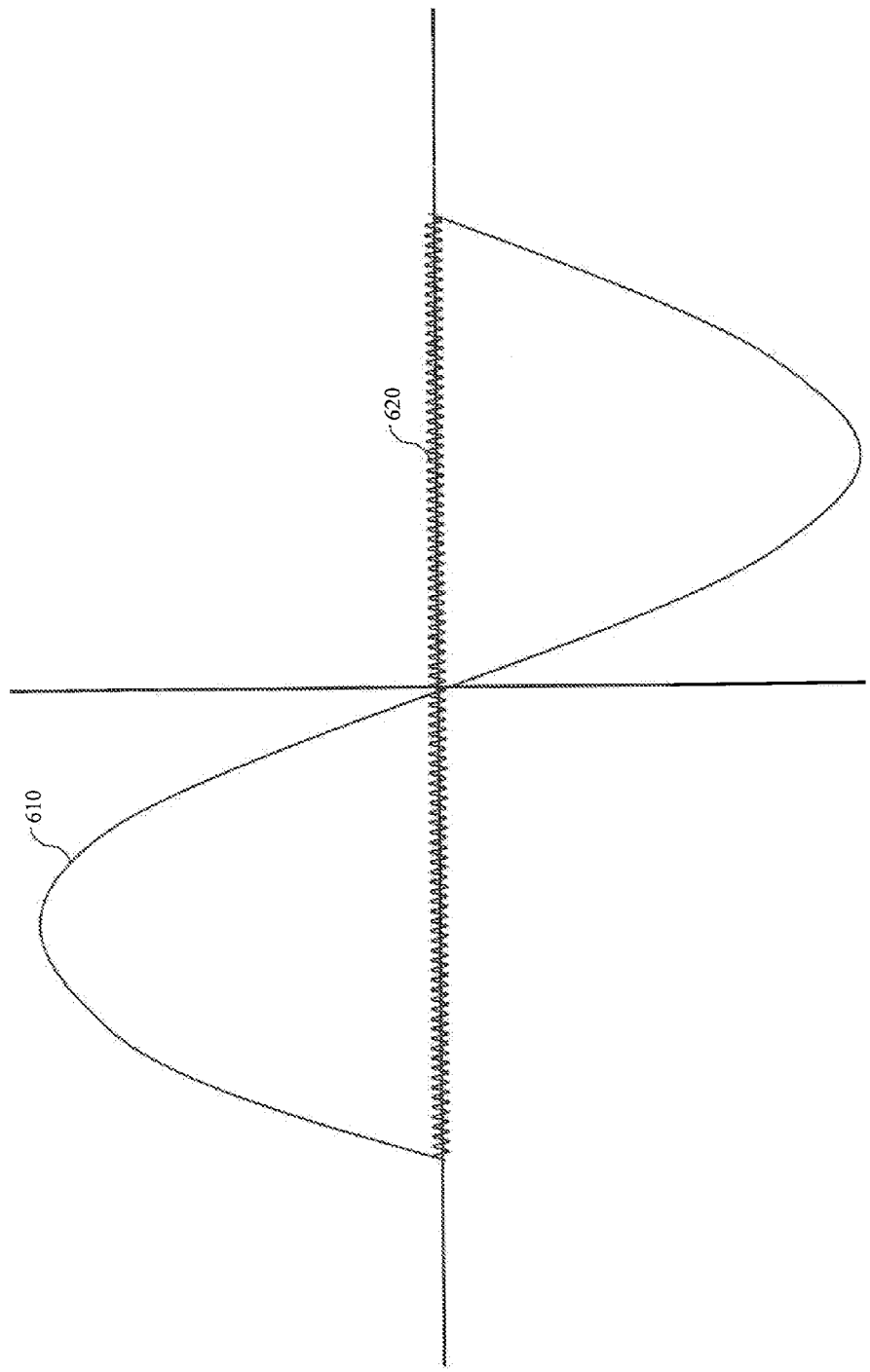
FIG. 6 illustrates exemplary oscillator outputs of a voltage-controlled oscillator and a crystal oscillator.

FIG. 6 illustrates exemplary oscillator outputs of a voltage-controlled oscillator and a crystal oscillator. As shown in FIG. 6, the higher frequency VCO signal 620 has several periods that occur within a single period of the lower frequency CO signal 612. Further, because both signals are sinusoidal, each signal crosses a zero voltage with every half period (or twice per period). Therefore, the relationships between the signals, and particularly the phase of the VCO signal 620, can be measured based on these zero crossings.

While receiving the CO and VCO signals from the local oscillator module 460, the phase-to-digital converter module 430 can begin detecting zero crossings of the two signals. At some zero crossing of the CO, the phase-to-digital converter module 430 initiates a counter to track the number of zero crossings of the VCO within a given time period, where the given time period can be any number of half-periods of the CO signal. During this time period, the counter is increased each time the VCO signal crosses zero voltage.

At the conclusion of the time period, the phase-to-digital converter module 430 forwards the detected number of zero crossings of the VCO to the phase noise tracking/processing module 420. The phase-to-digital converter module 430 may also forward the time period associated with the measured zero crossings. From this information, the phase noise tracking/processing module 420 determines the phase offset of the local VCO within the local oscillator module 460.

Using the above examples of the signals generated by the CO and the VCO, the PN tracking/processing module 420 knows the output frequency of the CO (50 MHz) and the desired output frequency of the VCO (5 Ghz). From this, the PN tracking/processing module 420 can calculate an expected number of zero crossings as $$ZC_{vcoex} = \left(\frac{f_{vco}}{f_{co}}\right)(ZC_{co} - 1), \tag{1}$$

where $ZC_{vcoex}$ is the expected number of zero crossings of the VCO signal, $ZC_{co}$ is the number of zero crossings of the CO signal (including both the starting zero crossing and the ending zero crossing, based on the received time period), $f_{vco}$ is the expected frequency of the VCO signal, and $f_{co}$ is the frequency of the CO signal.

Once the PN tracking/processing module 420 has determined the reference number of zero crossings, the PN tracking/processing module 420 compares the actual number of detected zero crossings to the expected number to determine if the VCO signal includes an undesired phase component, and the size of that phase component.

For example, applying the above example to equation (1), the PN tracking/processing module 420 determines that for a single period of the CO signal, the expected number of zero crossings $ZC_{vcoex}$=(5 GHz/50 MHz)*(3−1)=200 zero crossings. The PN tracking/processing module 420 then compares the measured zero crossings to the calculated expected number of zero crossings in order to determine the phase component. For example, if the phase-to-digital converter module 430 detected 203 zero crossings during the time period, then the PN tracking/processing module 420 determines the phase offset to be 3 zero crossings for every 200. This result is then forwarded to the pre-compensation module 410.

It should be noted that, although in the above example measurements were taken over a single period of the CO signal, it may be beneficial to take measurements over a longer or shorter time period. In addition, the PN tracking/processing module 420 may store multiple sets of consecutive measurements for additional processing. Such processing may include averaging and/or Kalman filtering, among others, in order to obtain a more accurate representation of a current and/or future phase offset in the VCO signal.

2. Compensation

Using the phase offset calculated by the PN tracking/processing module 420, the pre-compensation module 210 adjusts signals being sent to the RF module 404 in order to compensate for this frequency shift, The signal being generated by the VCO can substantially be approximated as a complex exponential:

$$e^{j(\Omega t+\phi)}, \quad (2)$$

where $j=\sqrt{-1}$, because $e^{jx}=\cos(x)+j\sin(x)$. Applying properties of exponentials to equation (2) yields:

$$e^{j(\Omega t+\phi)}=e^{j\Omega t}e^{j\phi}. \quad (3)$$

$e^{j\Omega t}$ represents the desired "perfect" signal with no undesired phase component. Therefore, in order to digitally compensate for the phase component, the pre-compensation module 410 can multiply the data signal by $e^{-j\phi}$, which will substantially cancel the phase component injected by the noisy VCO during the subsequent up-conversion, provided that the calculated phase offset is close to the actual phase component. Advantageously, this can be performed in the digital domain using, for example, a complex multiplier.

In this manner, the phase noise being generated by the VCO can be compensated for in an incoming data signal. Further, by employing Kalman filtering on the measured phase offsets, a predictive phase offset can be injected into the data signal in order to more accurately compensate for the future phase noise of the VCO. In addition, because this can all be performed in the digital domain, computation and processing can be performed with relative ease and simplicity.

Figure 7:
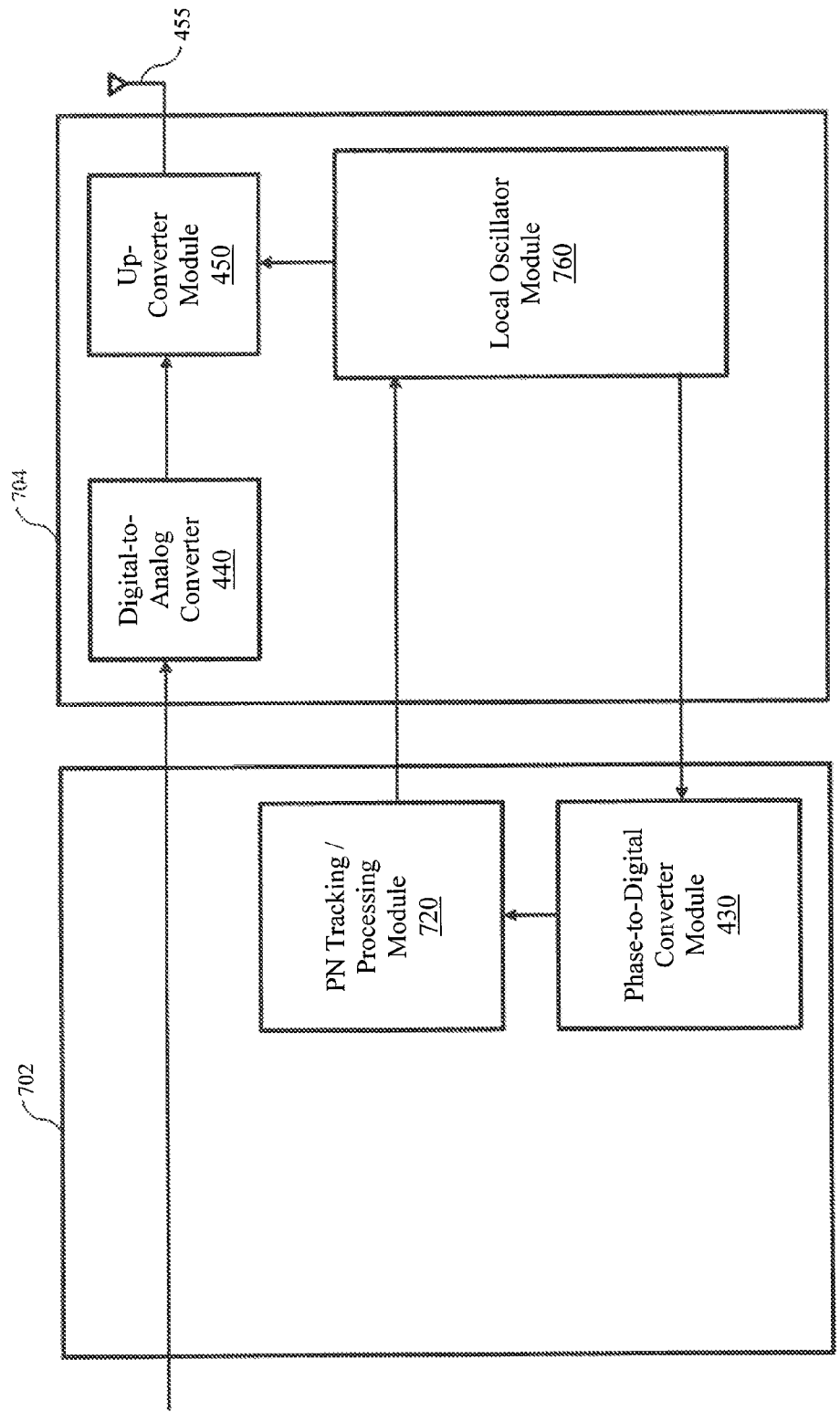
FIG. 7 illustrates an exemplary compensation module and RF module that may be implemented within the transmitter.
Figure 8:
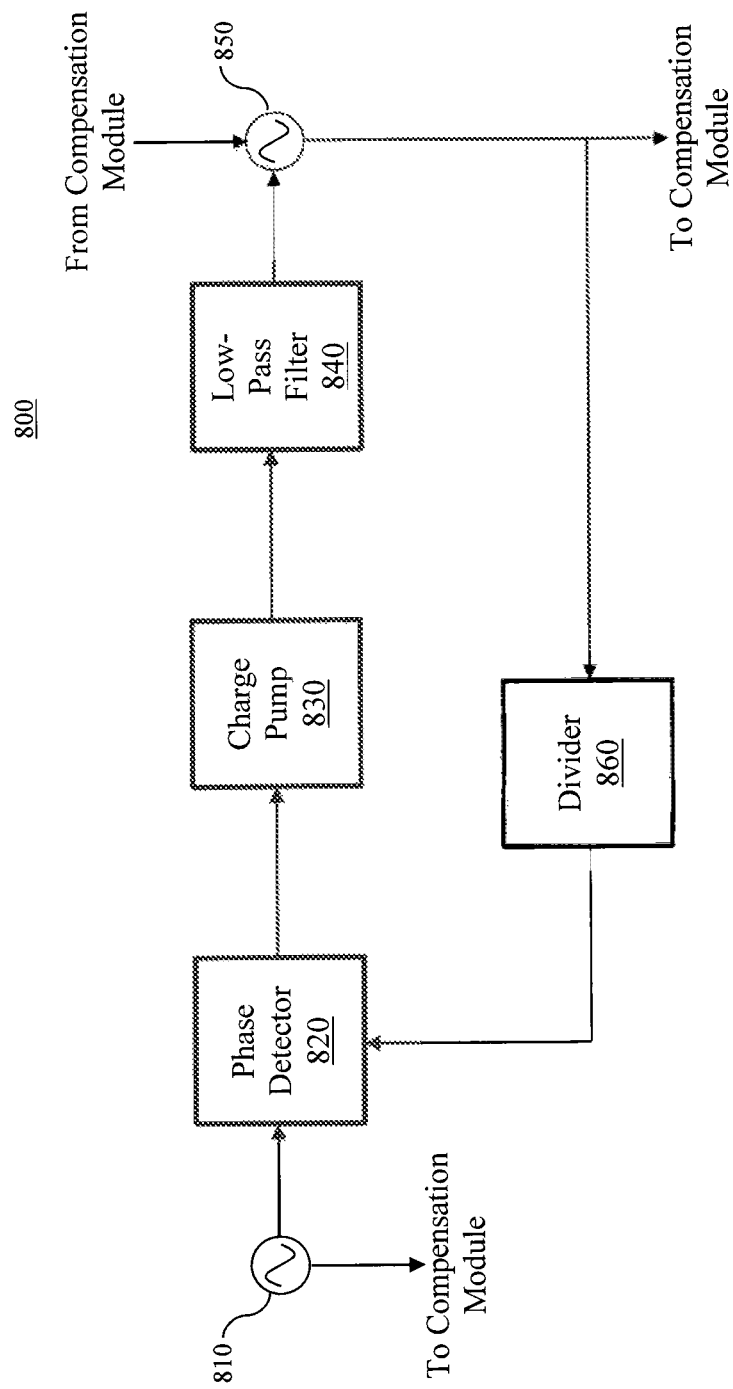
FIG. 8 illustrates an exemplary phase-locked loop that may be implemented within the transmitter.

In another embodiment, compensation may be performed by adjusting a voltage supplied to the VCO, as shown in FIGS. 7 and 8. For example, FIG. 7 illustrates an exemplary compensation module 702 and RF module 704 that may be implemented within the transmitter 300. The compensation module 702 includes substantially the same configuration as the compensation module 402, but no longer includes the pre-compensation module 410 and now includes a PN tracking/processing module 720. The RF module 704 includes substantially the same configuration as the RF module 404, but now includes a local oscillator module 760.

In this embodiment, the phase component detected by the phase-to-digital converter module 430 is processed by the PN tracking/processing module 720 into an adjustment voltage that is supplied to the local oscillator module 760. In particular, as discussed above, the phase offset generated by the local oscillator module 760 likely results from a noisy voltage-controller oscillator, whose frequency can be adjusted based on a voltage input. Therefore, by supplying an adjustment voltage to the local oscillator module 760, the VCO can be corrected to have reduced phase noise. This embodiment can be performed as an alternative, or in addition to, the embodiment discussed above.

FIG. 8 illustrates a block diagram of an exemplary phase-locked loop (PLL) 800 that may be implemented within the local oscillator modules 460, 760 of the RF module 704. As shown in the PLL 800, a first oscillator (e.g., a crystal oscillator CO) 810 provides a reference signal to a phase detector 820. The phase detector 820 detects the phase difference between the reference signal and the signal generated by a second oscillator (e.g., voltage-controller oscillator) 850. A charge pump 830 then generates adjustment signals for adjusting the phase of the second oscillator 850, which are filtered by a low-pass filter 840 before being supplied to the second oscillator 850. In a feedback loop that supplies the VCO output to the phase detector 820, a divider 860 may be included to reduce a frequency of the second oscillator signal so that it may be properly compared with the reference signal by the phase detector 820.

In the PLL 800, the first oscillator 810 and the second oscillator 850 provide each of their signals to the phase-to-digital converter module 430, which determines the phase offset of the signal output by the second oscillator 850. This phase offset is then forwarded to the PN tracking/processing module 720, which performs various processing on the phase (e.g., averaging, Kalman filtering, etc.) and converts the calculated phase offset to an adjustment voltage, which it then supplies to the second oscillator 850.

Exemplary Method For Compensating For Phase Noise in a Transmitter

Figure 9:
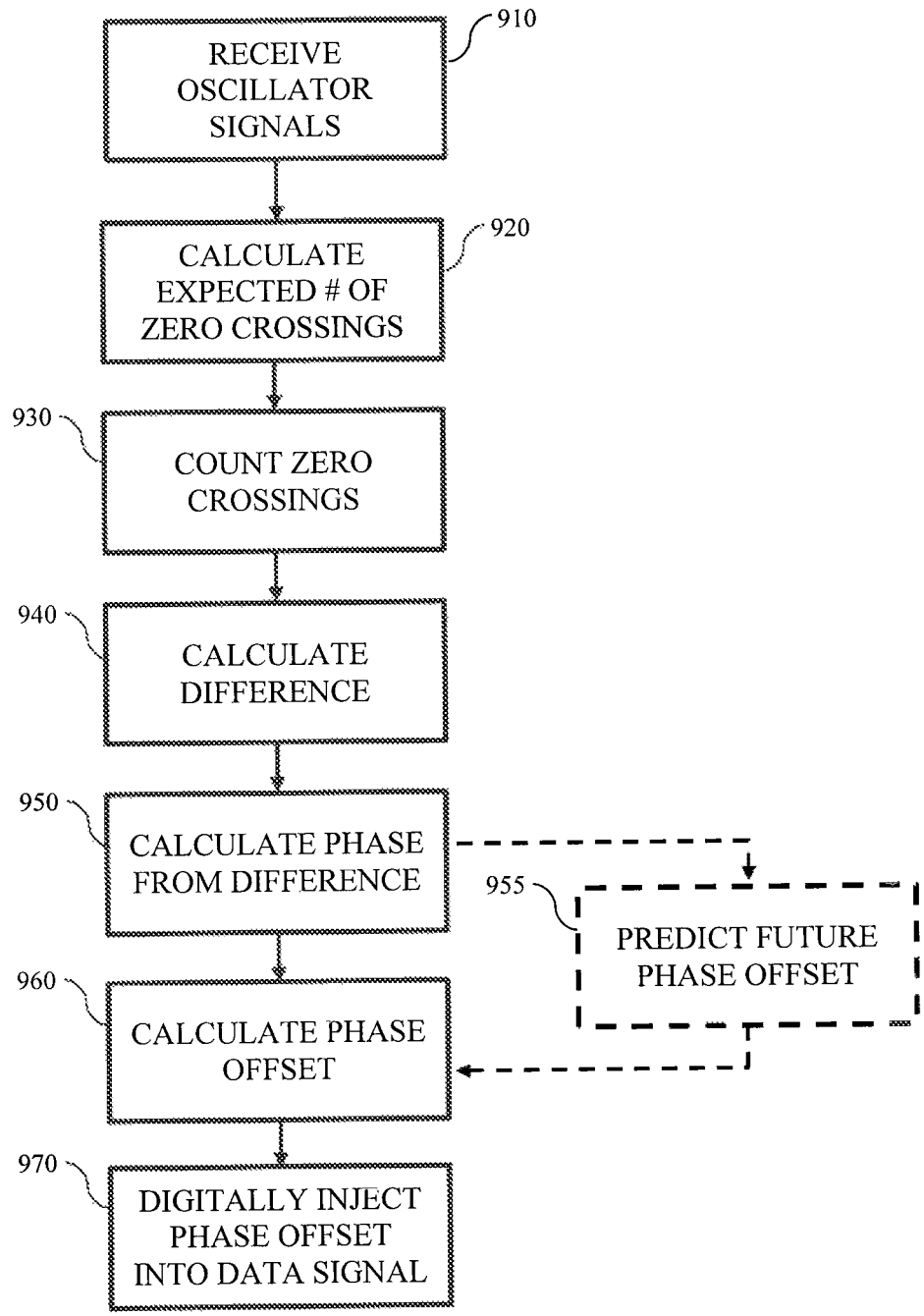
FIG. 9 illustrates a block diagram of an exemplary method for compensating for a phase noise in a signal generated by a transmitter oscillator.

FIG. 9 illustrates a block diagram of an exemplary method for compensating for a phase offset generated by a transmitter oscillator.

In the method, the transmitter receives signals output by transmitter oscillators (910). These signals may include an output of a first oscillator (e.g., crystal oscillator) and a second oscillator (voltage-controlled oscillator). Once the signals have been received, the transmitter calculates an expected number of zero crossings of the second oscillator for a given time period (920). The expected number represents the number of times the signal generated by the second oscillator is expected to cross a zero voltage during the given time period. The given time period can be based on a pre-determined number of half-cycles of the first oscillator signal. Stated another way, the given time period may a fractional or an integer number periods of the first oscillator signal, where the first oscillator signal is considered a zero-phase noise or low phase noise reference.

The transmitter counts a number of actual zero crossings of the second signal, using the first oscillator signal as a reference for the time period (930). Once the actual number of zero crossings has been determined, the transmitter calculates a difference between the desired number and the actual number of zero crossings (940).

From this difference, the transmitter calculates an undesired phase component that is included within the signal generated by the second oscillator (950). Optionally, the transmitter can then perform predictive processing on the calculated phase component in order to predict the undesired phase component that will be injected by the second oscillator when a current or future data signal is modulated thereby (955). Once the phase component is known, a phase offset can be calculated to cancel the phase component that is causing the phase noise (960). Once the phase offset has been calculated, the transmitter digitally injects the phase offset into the data signal in order to pre-compensate that signal for the phase noise that is being generated by the second oscillator (970).

Those skilled in the relevant art(s) will recognize that the method can additionally or alternatively include any of the functionality of the wireless transmitter 300 and/or the compensation module 320 discussed above, and the above description of the exemplary method should neither be construed to limit the method nor the description of the wireless transmitter 300 or the compensation module 320. In addition, although described for use in a wireless transmitter, the same or a substantially similar method can be applied in a receiver or other device that utilizes a noisy oscillator, within the spirit and scope of the present disclosure.

Exemplary Computer System Implementation

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 10:
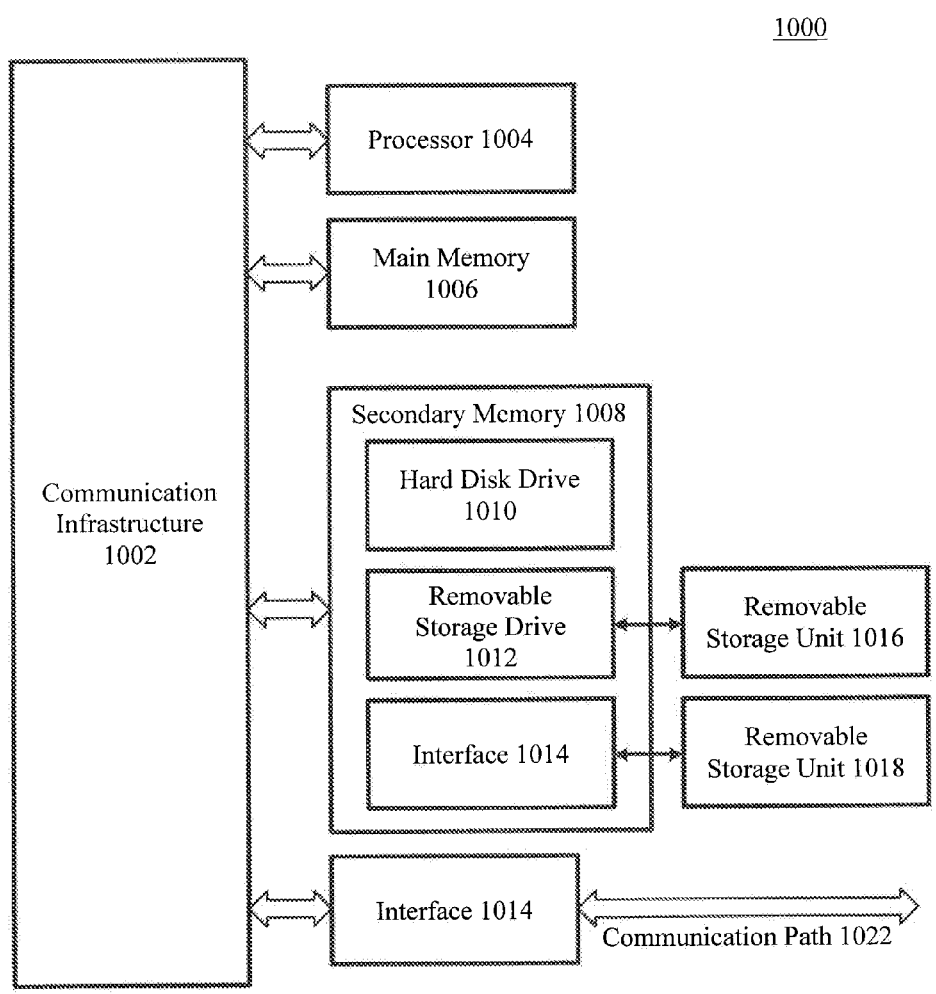
FIG. 10 illustrates a black diagram of a general purpose computer.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 1000 is shown in FIG. 10. One or more of the modules depicted in the previous figures can be at least partially implemented on one or more distinct computer systems 1000, including, for example, the phase-to-digital converter module 430, the phase noise tracking/processing module 420, and/or the pre-compensation module 410 contained therein.

Computer system 1000 includes one or more processors, such as processor 1004. Processor 1004 can be a special purpose or a general purpose digital signal processor. Processor 1004 is connected to a communication infrastructure 1002 (for example, a bus or network). Various software implementations are described in terms of this exemplary computer system. After reading this description, it will become apparent to a person skilled in the relevant art(s) how to implement the disclosure using other computer systems and/or computer architectures.

Computer system 1000 also includes a main memory 1006, preferably random access memory (RAM), and may also include a secondary memory 1008. Secondary memory 1008 may include, for example, a hard disk drive 1010 and/or a removable storage drive 1012, representing a floppy disk drive, a magnetic tape drive, an optical disk drive, or the like. Removable storage drive 1012 reads from and/or writes to a removable storage unit 1016 in a well-known manner. Removable storage unit 1016 represents a floppy disk, magnetic tape, optical disk, or the like, which is read by and written to by removable storage drive 1012. As will be appreciated by persons skilled in the relevant art(s), removable storage unit 1016 includes a computer usable storage medium having stored therein computer software and/or data.

In alternative implementations, secondary memory 1008 may include other similar means for allowing computer programs or other instructions to be loaded into computer system 1000. Such means may include, for example, a removable storage unit 1018 and an interface 1014. Examples of such means may include a program cartridge and cartridge interface (such as that found in video game devices), a removable memory chip (such as an EPROM, or PROM) and associated socket, a thumb drive and USB port, and other removable storage units 1018 and interfaces 1014 which allow software and data to be transferred from removable storage unit 1018 to computer system 1000.

Computer system 1000 may also include a communications interface 1020. Communications interface 1020 allows software and data to be transferred between computer system 1000 and external devices. Examples of communications interface 1020 may include a modem, a network interface (such as an Ethernet card), a communications port, a PCM-CIA slot and card, etc. Software and data transferred via communications interface 1020 are in the form of signals which may be electronic, electromagnetic, optical, or other signals capable of being received by communications interface 1020. These signals are provided to communications interface 1020 via a communications path 1022. Communications path 1022 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 1016 and 1018 or a hard disk installed in hard disk drive 1010. These computer program products are means for providing software to computer system 1000.

Computer programs (also called computer control logic) are stored in main memory 1006 and/or secondary memory 1008. Computer programs may also be received via communications interface 1020. Such computer programs, when executed, enable the computer system 1000 to implement the present disclosure as discussed herein. In particular, the computer programs, when executed, enable processor 1004 to implement the processes of the present disclosure, such as any of the methods described herein. Accordingly, such computer programs represent controllers of the computer system 1000. Where the disclosure is implemented using software, the software may be stored in a computer program product and loaded into computer system 1000 using removable storage drive 1012, interface 1014, or communications interface 1020.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the invention should not be limited by any of the above-described exemplary embodiments, but should be defined only in accordance with the following claims and their equivalents.

What is claimed is:

1. A wireless transmitter, comprising:
a first oscillator configured to generate a first signal;
a second oscillator configured to generate a second signal;
a phase-to-digital converter module configured to detect a phase component of the second signal using the first signal as a reference signal;
a phase noise processing module configured to calculate, from the detected phase component, a phase offset that substantially compensates for the phase component; and
a pre-compensation module configured to pre-compensate a data signal for the phase component of the second signal based on the calculated phase offset,
wherein the phase-to-digital converter module is configured to detect the phase component of the second signal by detecting a number of zero crossings of the second signal within a predetermined time period, and comparing the detected number of zero crossings to an expected number of zero crossings.

2. The wireless transmitter of claim 1, wherein the pre-compensation module is configured to pre-compensate the data signal for the phase component by digitally injecting the calculated phase offset into the data signal.

3. The wireless transmitter of claim 2, wherein the digital injection of the calculated phase offset includes multiplying, by a complex multiplier, the data signal by the calculated phase offset.

4. The wireless transmitter of claim 1, wherein the phase-to-digital converter includes a voltage detector configured to detect zero crossings of the first signal or the zero crossings of the second signal.

5. The wireless transmitter of claim 4, wherein the phase-to-digital converter module includes a counter configured to track the number of the zero crossings of the second signal that occur within the predetermined time period.

6. The wireless transmitter of claim 5, wherein the phase-to-digital converter module is configured to calculate the expected number of zero crossings.

7. The wireless transmitter of claim 1, wherein the phase-to-digital converter module is configured to identify at least one of a beginning and an end of the predetermined time period by detecting a zero crossing of the first signal.

8. The wireless transmitter of claim 1, wherein the phase noise processing module is configured to calculate the phase offset by averaging consecutive detected phase components detected over consecutive time intervals.

9. The wireless transmitter of claim 1, wherein the phase noise processing module is configured to calculate the phase offset by performing Kalman filtering on consecutive detected phase components detected over consecutive time intervals.

10. A wireless communication device, comprising:
a local oscillator module configured to generate an oscillating signal;
a phase-to-digital converter module configured to detect a phase component of the oscillating signal;
a phase noise processing module configured to calculate a phase offset from the detected phase component;
a pre-compensation module configured to digitally pre-compensate a data signal for the phase component of the oscillating signal using the calculated phase offset; and
a wireless transmitter module configured to transmit the pre-compensated data signal,
wherein the phase-to-digital converter module is configured to detect the phase component of the oscillating signal by detecting a number of zero crossings of the oscillating signal within a predetermined time period, and comparing the detected number of zero crossings to an expected number of zero crossings.

11. The wireless communication device of claim 10, wherein the phase noise processing module is configured to generate an adjustment voltage based on the calculated phase offset, and
wherein the phase noise processing module is configured to supply the adjustment voltage to the local oscillator module so as to reduce the phase component of the oscillating signal.

12. The wireless communication device of claim 10, wherein the phase-to-digital converter module is configured to adjust the predetermined time period based on a rate of change of the phase component detected over consecutive time intervals.

13. The wireless communication device of claim 10, wherein the pre-compensation module is configured to multiply the data signal by the calculated phase offset.

14. The wireless communication device of claim 13, wherein the phase offset is equal to $e^{-j\phi}$, where j is the square root of −1 and $\phi$ is the measured phase component.

15. A method for pre-compensating for phase noise in an oscillating signal generated by a wireless transmitter oscillator, the method comprising:
detecting a number of zero crossings of the oscillator signal over a predetermined time period;
calculating an expected number of zero crossings of the oscillator signal for the predetermined time period;
calculating a phase component of the oscillating signal by comparing the detected number of zero crossings to the expected number of zero crossings;
calculating a phase offset from the calculated phase component; and
digitally pre-compensating a data signal for the calculated phase component based on the calculated phase offset.

16. The method of claim 15, further comprising:
storing a plurality of consecutively calculated phase components,
wherein the calculating of the phase offset includes digitally processing the stored plurality of consecutively calculated phase components.

17. The method of claim 15, wherein the predetermined time period is an integer number of half-cycles of a reference oscillator signal that is predetermined to have low phase noise.

18. The method of claim 15, wherein the digitally pre-compensating of the data signal includes digitally multiplying the data signal by the calculated phase offset.

19. The method of claim 15, further comprising:
storing a plurality of consecutively calculated phase components;
calculating a rate of change of the phase component of the oscillating signal based on the plurality of consecutively calculated phase components; and
adjusting the predetermined time period based on the calculated rate of change.

* * * * *